United States Patent [19]
Norris

[11] Patent Number: 5,796,733
[45] Date of Patent: Aug. 18, 1998

[54] TIME DIVISION SWITCHING SYSTEM

[75] Inventor: Joseph P. Norris, Mt. Laurel, N.J.

[73] Assignee: General Signal Corporation, Stamford, Conn.

[21] Appl. No.: 675,165

[22] Filed: Jul. 3, 1996

[51] Int. Cl.$^6$ .................................................. H04Q 11/04
[52] U.S. Cl. ........................................... 370/366; 370/371
[58] Field of Search ........................ 370/355, 352, 370/353, 357, 360, 389, 538–545, 361, 366, 369, 370, 372, 376, 375, 380, 387, 388, 396, 374, 371, 381

[56] References Cited

U.S. PATENT DOCUMENTS

| | | | |
|---|---|---|---|
| 3,806,657 | 4/1974 | Chow | 179/15 AQ |
| 4,114,143 | 9/1978 | Karnaugh | 340/166 R |
| 4,344,170 | 8/1982 | Arita | 370/68 |
| 4,616,358 | 10/1986 | Rehm et al. | 370/58 |
| 4,817,226 | 4/1989 | Beckner et al. | 370/395 |
| 4,833,670 | 5/1989 | Lebizay et al. | 370/58 |
| 4,849,964 | 7/1989 | Baardewijk | 370/63 |
| 4,855,999 | 8/1989 | Chao | 370/538 |
| 4,878,215 | 10/1989 | Rogers | 370/58.1 |
| 4,901,308 | 2/1990 | Deschaine | 370/267 |
| 4,935,921 | 6/1990 | Ishizaki et al. | 370/58.1 |
| 5,033,045 | 7/1991 | Ramel et al. | 370/85.13 |
| 5,119,368 | 6/1992 | Hiltner et al. | 370/58.1 |
| 5,282,214 | 1/1994 | Dravida | 371/37.6 |

*Primary Examiner*—Dang Ton
*Attorney, Agent, or Firm*—Ohlandt, Greeley, Ruggiero & Perle

[57] ABSTRACT

There is provided a switching system that includes a plurality of input lines for transmitting time division multiplexed data signals, and a conversion means for receiving and converting the respective data signals into a non-time division multiplexed, parallel format, group of N data signals. The system also includes a crosspoint switch having a group of N/K outputs, a first group of N inputs connected to the respective outputs of the conversion means, and a second group of N/K select or control inputs. In addition, a control means includes connection memory that constitutes a means for addressing the crosspoint switch at the select inputs, and the outputs of a group of N/K multiplexers are connected to the select inputs and the inputs of the group of N/K multiplexers are connected to the control means.

8 Claims, 2 Drawing Sheets

CL: 96 MHZ

SYNC: 24 MHZ
= TDM RATE

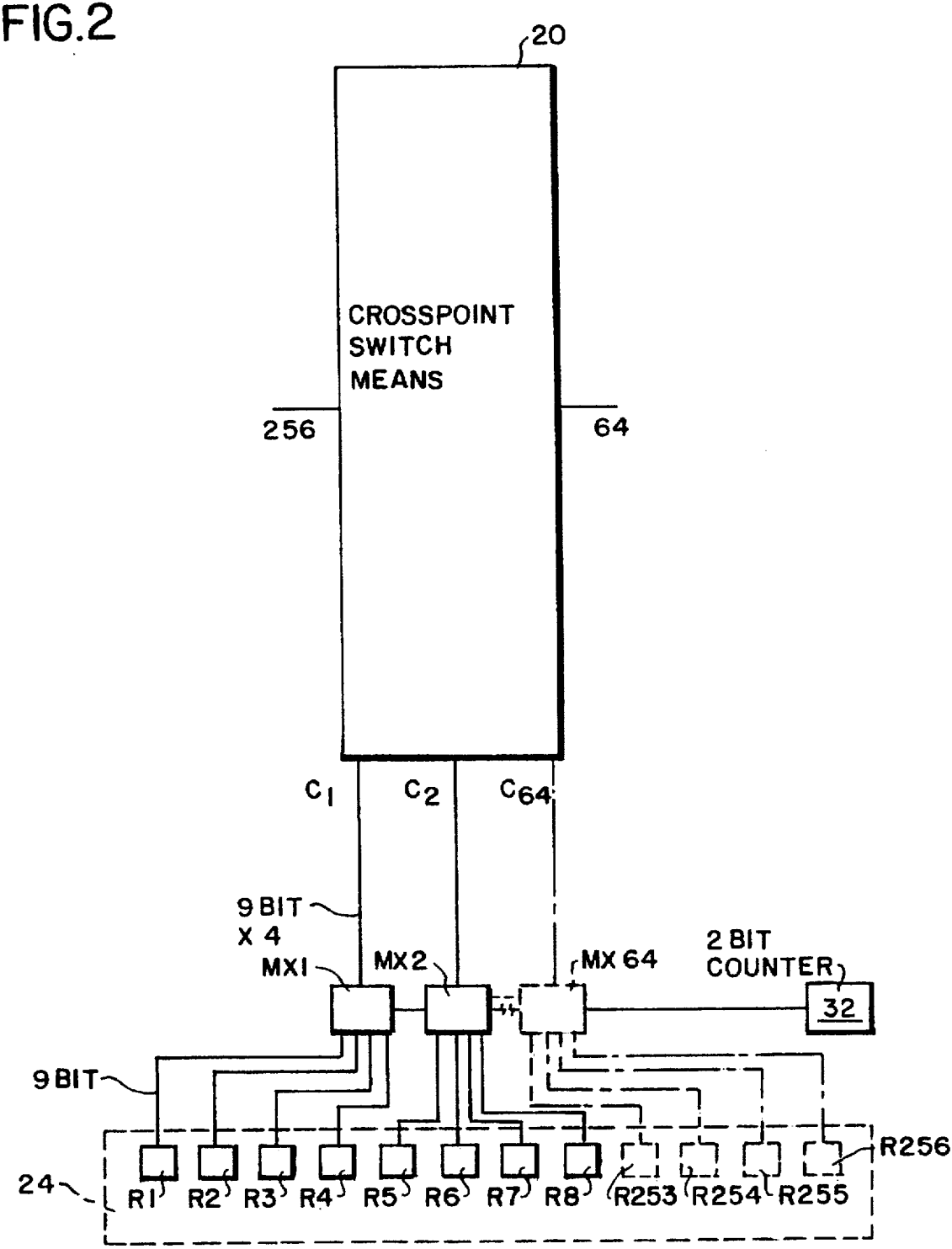

TIME DIVISION SWITCHING SYSTEM

RELATED APPLICATIONS

The following patent applications contain subject matter related to that of the present invention. They are assigned to the same assignee as the present invention:

100.0614 Ser. No. 08/674,839, filed Jul. 3, 1996 Fault Tolerant Synchronous Clock Distribution 100.0616 Ser. No. 08/675,503, filed Jul. 3, 1996 Fault Tolerant Switch Fabric With Control and Data Correction By Hamming Codes 100.0617 Ser. No. 08/675,491, filed Jul. 3, 1996 Fault Tolerant Switch Fabric With Control and Data Correction By Hamming Codes and Error Inducing Check Register

FIELD OF THE INVENTION

The present invention relates to time division switching systems; it generally relates to data handling techniques involved in such systems, and more particularly techniques of time division multiplexing and crosspoint switching.

BACKGROUND OF THE PRESENT INVENTION

In order for the man skilled in the art to appreciate the ramifications of the present invention, reference may be made to the following U.S. patents:

U.S. Pat. No. 3,806,657
U.S. Pat. No. 4,114,143
U.S. Pat. No. 4,344,170
U.S. Pat. No. 4,855,999
U.S. Pat. No. 4,878,215
U.S. Pat. No. 5,119,368

With particular reference to U.S. Pat. No. 4,855,999, there is disclosed in this patent a multiplex arrangement in conjunction with a crosspoint switch, involving what is termed "dynamic time division multiplexing", including a set of multiplexers and de-multiplexers required to supply the technique to an actual telecommunications network. Such a system is capable of effectively handling both circuit and packet traffic, and thus provides a migration strategy between the present circuit-switched telephone network and the future broad band, packet-switched network.

The other cited patents above disclose various other switching systems most of which are designed to provide high speed voice/data switching with efficient utilization of available bandwith and minimal switching delay. One reference in particular, i.e., U.S. Pat. No. 4,114,143, discloses a switching network for digital, time division multiplex channels that may be constructed by placing on a single structural unit an input buffer with connection to one column of an orthogonal crosspoint matrix, an output buffer, a row of crosspoint gates with connections to all columns of said orthogonal crosspoint matrix, and transfer control logic.

Whatever the merits of the different time division switching systems cited, the fact remains that none of them recognizes that by capitalizing on the ease of addressing possessed by 1-stage architecture, one can adapt such architecture for a task normally calling for a more complex architecture, such as a 3-stage switching system. As a result, the present invention offers a substantial improvement over the traditional N×N crosspoint switching implementation, while maintaining the convenient addressing characteristic of 1-stage architecture. The notable advantage which follows from the principle thus recognized is that the amount of multiplexing hardware normally required can be substantially reduced.

It will be understood that such 3-stage crosspoint switches of the CLOS type have an order complexity $[N^{}(3/2)]$ which per se is clearly better than that exhibited by conventional 1-stage architecture having an order of complexity $[N^{}2]$. However, what has been further recognized by the present invention is that a 1-stage architecture is easier to address than a 3-stage architecture.

Accordingly, it is an over-arching objective of the present invention to significantly reduce the multiplexing hardware normally required with non-blocking crosspoint switching.

Another object is to interchange in a non-blocking and arbitrary fashion time multiplexed data on N/K TDM input lines to N/K TDM output lines, thereby effectively providing an N×N crosspoint switch.

Yet another object of the invention is to reduce the number of physical connections by K-fold for the effective N×N crosspoint switch through the use of time division multiplexing techniques.

Another object is to obtain a K-fold improvement in the total amount of hardware required to implement the non-blocking N×N crosspoint switch forming part of the system.

SUMMARY OF THE INVENTION

These and other objects of the invention are realized by the provision of a signal switching system which embodies a single stage and is adapted to receive serial data input. The serial data inputs have been time division multiplexed into N/K data inputs signal lines where K is an integer>1 representing the number of bits in each serial data input and N is the total number of bits in all of the serial data inputs. In such environment or context, the present invention exploits the opportunity to reduce the amount of multiplexing hardware normally deployed.

The system configuration of the present invention accepts an N/K group of the afore-noted time division multiplexed input lines and converts the data signals appearing thereon in serial format into a corresponding N non-time division multiplexed parallel format by a conversion means, preferably in the form of a group of input shift registers. The signals on the N lines are then presented to the crosspoint switch matrix, involving an N×(N/K) crosspoint switch, the crosspoint switch being addressed at the time division multiplex rate by a control memory. The control memory is accessed using (N/K) multiplexers which, in turn, feed a group of select lines of the N×(N/K) crosspoint switch.

The primary feature of the present invention is therefore summarized as follows:

A switching system having a plurality of input lines for transmitting time division multiplex data signals, and a conversion arrangement for converting the respective data signals into a non-time division multiplex, parallel format, set of data signals. A crosspoint switch having a group of N/K outputs, a first group of N inputs connected to the respective outputs of the conversion arrangement as well as a second group of N/K inputs, which are the select inputs. A control means, including a control memory, is connected to the N/K select inputs through N/K multiplexers for effecting the crosspoint switch connections.

A more specific feature of the present invention includes a group of serial input, parallel output, shift registers connected between the time division multiplex (TDM) data input and the crosspoint switch. Also, preferably included is a pipeline register, connected to the outputs of the shift registers, which synchronously samples the data from the shift registers at the time division multiplex rate. For example, the shift registers operate at 96 MHz, while the TDM rate for the pipeline register is one fourth of that or 24 MHz.

3

Other and further objects, advantages and features of the present invention will be understood by reference to the following specification in conjunction with the annexed drawings, wherein like parts have been given like numbers.

BRIEF DESCRIPTION OF THE DRAWING

FIG. 2 is a block-schematic diagram of portions of the system of FIG. 1, illustrating further details.

DESCRIPTION OF THE PREFERRED EMBODIMENT

Figure 1:
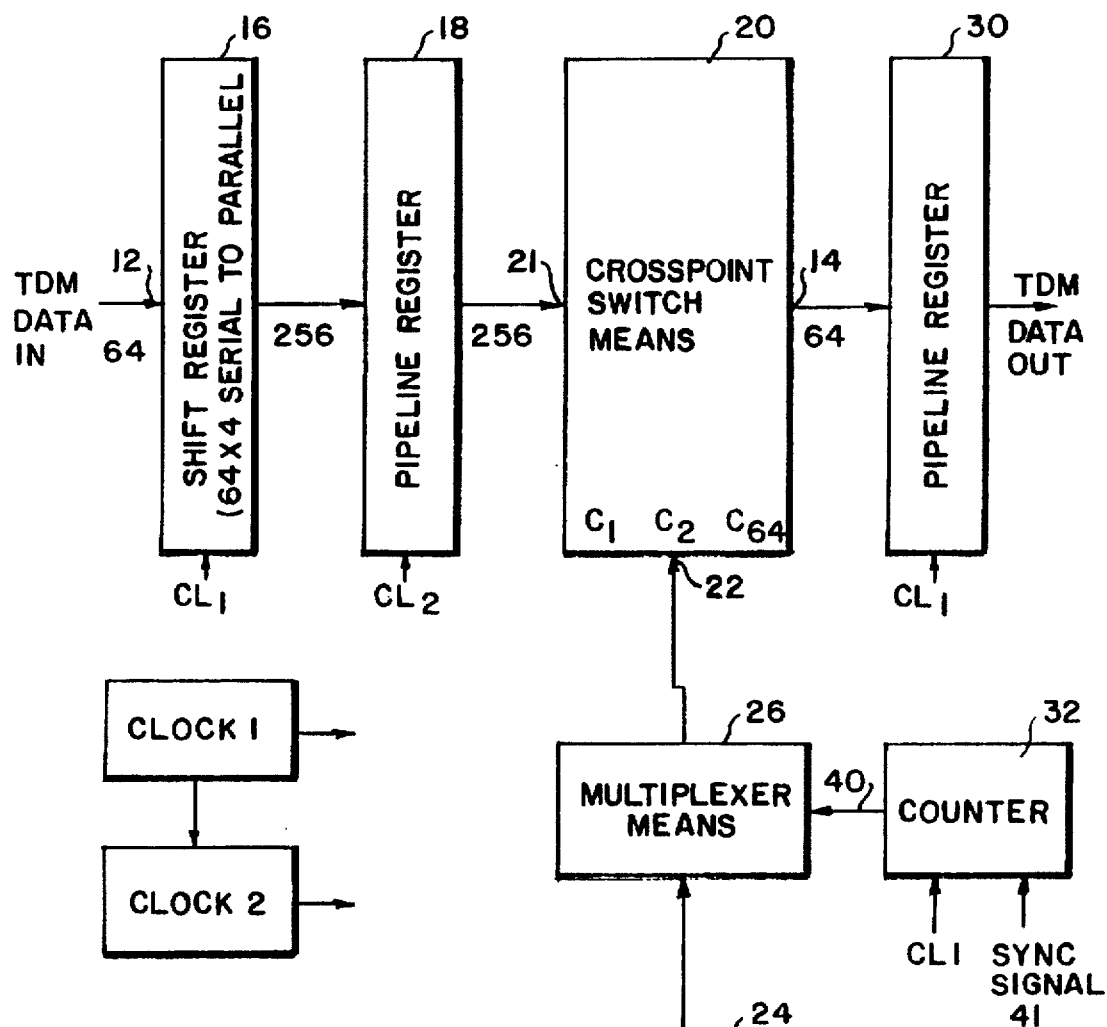
FIG. 1 is a block, single line, diagram of a preferred embodiment of the time division switching system of the present invention.

Referring now to the figures of the drawing, there will be seen in FIG. 1 the time division multiplexing system of the present invention. Time division multiplex (TDM) data is supplied at the input 12 and after being processed through the system emerges as time division data out at the output 14. Conveyed to input 12 are 64 lines, each line representing 4-way TDM data. A conversion means 16, preferably in the form of serial input, parallel output shift registers, operating, for example, at 96 MHz acts to convert the incoming time division multiplex (TDM) data into its broadside parallel equivalent; that is, into an output having a non-TDM, parallel format, set of data signals.

Accordingly, at this stage it will be appreciated that at the output of the shift registers there are presented 256 parallel bits of data in a given time slot or frame equivalent to the previously 64 serial streams of 4 bits each at the input. A 256 bit pipeline register 18 is next in the data path. Such pipeline register is a well-known component and is capable of synchronously sampling the shift register data at a 24 MHz rate (that is, the TDM cycle rate, which is one fourth the operating rate of the shift register conversion means).

Continuing along the data path, it will be understood that the 256 bits in parallel format from the output of pipeline register 18 are fed to a crosspoint switch 20, such as a non-blocking type crosspoint switch, which itself may need to be internally pipelined because of the speeds involved. That is to say, if it is found necessary for reaching desirable speeds an additional pipeline register would be inserted in the path.

It becomes necessary to convert the parallel format data back into its 64 channel (or line) TDM equivalent, which is what was originally present at the beginning of the data path, except data channels are now interchanged to effect a crosspoint switch. For this purpose, select or control inputs 22 are provided for the crosspoint switch 20 in addition to the data inputs 21. These select inputs for the crosspoint switch originate from the address registers in the connection memory 24 (FIG. 2); also called the control memory for reasons which will be apparent. A 4:1 multiplexer means 26 is connected to the select inputs 22 of the crosspoint switch, and the connection memory 24 is connected to the input of multiplexer means 26. Thus, the multiplexer means 26 accomplishes the conversion of the parallel data back into its 64 channel TDM mode.

Completing the data path at the top of FIG. 1 is an output pipeline register 30 for purposes already explained in connection with pipeline register 18. This pipeline register is clocked at 96 MHz vs. 24 MHz for pipeline register 18.

Additionally, as seen on the right of multiplexer means 26 is counter means 32, which comprises a $Log_2(K)$ bit counter

Figure 1A:
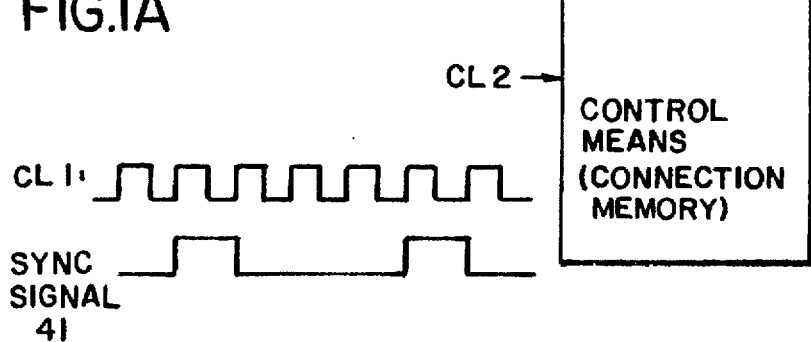
FIG. 1A is a timing diagram illustrating the clock and sync signals.

4 and which supplies select signals on line 40 to multiplexer means 26. The counter is synchronized to the TDM rate (24 MHz) by means of sync signal 41 (FIG. 1A). The required synchronization is supplied from a conventional clock board, as will be understood. Such clock board also supplies the proper clock rate, by an arrangement to be described, to the shift registers of the conversion means 16 (96 MHz), and to the multiplexers 26 (24 MHz) via the counter means 32, and to pipeline registers 18 (24 MHz) and 30 (96 MHz).

Referring now to FIG. 2 of the drawing, further details of the multiplexer means 26 and the control means 24 are illustrated therein. Control means 24 includes a total of 256 address registers R1-R256; and it will be noted that a first group of four registers R1-R4 is arranged for connection to a first multiplexer MX1, a second group of four registers R5-R8 connected to multiplexer MX2, etc., a 64th group R253-R256 to multiplexer MX64.

Each of the registers, R1-R256, is capable of storing nine bits, eight of which are used to address the 256 connection points or switch points within the crosspoint switch means 20. Eight of these bits are used for closing a particular switch, based on $Log_2(N)$, where N in the given case is 256. The extra or ninth bit is to disable a crosspoint switch, that is, force the output to zero. The well-known function of sampling each of the four outputs of 9 bits each from the respective registers R1-R4 is accomplished by MX1 such that a time division output results; that is, a serial format is produced, with individual time slots provided for each of the four, 9 bit, register outputs connected to MX1. The output of MX1 is taken to the control input C1 on the crosspoint switch 20.

It will be understood that a similar arrangement is provided for all the other groups of four registers from R5 to R256, and that appropriate sampling of each of their outputs takes place. Accordingly, time division signals appear at the outputs from the respective multiplexers MX2 through 64, 64 being the total number of individual multiplexers with 64 control lines being respectively connected from them to further control inputs C2-C64 on the crosspoint switch means 20.

It will be apparent that the several clock rates already noted have to be provided for the respective components; that is, for example, a TDM rate of 24 MHz for the pipeline register 18. A rate of 96 MHz from the counter means 32 is provided for the multiplexers 26, such that the desired connection of input to output at a particular switch that has been selected will take place once every 1/(96 MHz) seconds. The separate rates required are achieved simply by suitable division, such that the clock rate 2 is 24 MHz, or one fourth the rate of the main clock (clock rate 1).

One feature of the present invention is to accomplish N×N crosspoint switch functionality with a reduced amount of multiplexing hardware. An N×N 1-stage crosspoint switch is implemented by N N:1 multiplexers. For the present invention, the N inputs are time division multiplexed into N/K signal lines, where K is an integer>1, and the crosspoint switch is addressed at the TDM rate by the control memory. Thus, the N×(N/K) crosspoint switch, with its control memory structure that is synchronous to the TDM periodicity, essentially provides a K-fold improvement in the amount of hardware required to implement the functionality of an N×N crosspoint switch.

The invention having been thus described with particular reference to the preferred forms thereof, it will be obvious that various changes and modifications may be made therein without departing from the spirit and scope of the invention as defined in the appended claims.

I claim:

1. A switching system comprising:

a plurality of N/K input lines for transmitting respective data input signals in serial format at a predetermined time division multiplex rate; where K is an integer>1 representing the number of bits in each serial data input and N is the total number of bits in all of the serial data inputs;

conversion means, having plural outputs, said means being operative for receiving and converting the multiplexed data input signals into a non-time division multiplexed, parallel format, group of N data signals at respective outputs of said conversion means;

crosspoint switch means having a group of N/K data signals at the predetermined time division multiplex rate, on N/K outputs, respectively, and a first group of N inputs connected to the respective outputs of said conversion means; said crosspoint switch means also having a second group of N/K select inputs for controlling the selective connection of said first group of N inputs of said crosspoint switch means to the group of N/K outputs;

control means, including a connection memory, for storing N control signals to be transmitted to the select inputs of the crosspoint switch means, and for addressing the select inputs thereof; and a group of N/K time division multiplexers connected between said select inputs on said crosspoint switch means and said connection memory for converting the N control signals accessed from said memory into time division mutliplexed signals.

2. The switching system as defined in claim 1, in which said conversion means comprises a group of serial input, parallel output shift registers.

3. The switching system as defined in claim 1, further comprising a first pipeline register connected to the outputs of said conversion means, for synchronously sampling the data from said conversion means.

4. The switching system as defined in claim 3, in which said conversion means operates at K times the time division multiplex (TDM) rate, and said first pipeline register and said control means operate at the TDM rate.

5. The switching system as defined in claim 1, in which said multiplexers operate at K times the time division multiplex rate.

6. The switching system as defined in claim 5, in which the TDM rate is 24 MHz.

7. The switching system as defined in claim 1, in which said connection memory of said control means includes N address registers each storing 9 bits.

8. The switching system as defined in claim 1, in which a clock means is provided with first and second rates, the second rate being one fourth the first rate, the first rate being supplied to said conversion means, the second rate to said group of multiplexers.

* * * * *